United States Patent [19]

Suggitt et al.

[11] Patent Number: 4,778,485

[45] Date of Patent: Oct. 18, 1988

[54] POX PROCESS WITH HIGH TEMPERATURE DESULFURIZATION OF SYNGAS

[75] Inventors: Robert M. Suggitt, Wappingers Falls; Mitri S. Najjar, Hopewell Junction; Roger J. Corbeels, Wappingers Falls, all of N.Y.

[73] Assignee: Texaco Inc., White Plains, N.Y.

[21] Appl. No.: 90,822

[22] Filed: Aug. 28, 1987

[51] Int. Cl.$^4$ .............................................. C10J 3/46
[52] U.S. Cl. ................................... 48/197 R; 48/206; 48/210; 48/215; 252/373; 423/231
[58] Field of Search ............... 48/197 R, 206, DIG. 2, 48/210, 215, 211; 252/373; 423/231

[56] References Cited

U.S. PATENT DOCUMENTS

| | | | |
|---|---|---|---|
| 1,624,625 | 4/1927 | Raffloer | 423/231 |
| 1,626,664 | 5/1927 | Brody | 423/231 |
| 3,061,421 | 10/1962 | Landau et al. | 423/231 |
| 3,709,669 | 1/1973 | Marion et al. | 48/215 |
| 4,132,065 | 1/1979 | McGann | 48/215 |
| 4,201,751 | 5/1980 | Holter et al. | 423/231 |
| 4,233,275 | 11/1980 | Kimura et al. | 423/231 |
| 4,613,344 | 9/1986 | Henrich et al. | 48/197 R |
| 4,655,792 | 4/1987 | Kessler et al. | 48/197 R |
| 4,668,428 | 5/1987 | Najjar | 252/373 |
| 4,671,804 | 6/1987 | Najjar | 48/206 |

*Primary Examiner*—Peter Kratz
*Attorney, Agent, or Firm*—Robert A. Kulason; James J. O'Loughlin; Albert Brent

[57] ABSTRACT

Synthesis gas, fuel gas, or reducing gas is produced by the noncatalytic partial oxidation of a sulfur-containing liquid hydrocarbonaceous fuel or a slurry of sulfur-containing solid carbonaceous fuel with a free-oxygen containing gas in the free-flow reaction zone of a refractory lined gas generator at an autogenous temperature in the range of about 1900° F. to 2900° F. and above the ash-fusion temperature of the slag formed in the reaction zone, so that about 75 to 95 weight percent of the carbon in the fuel feed to the reaction zone is converted into carbon oxides. At least a portion of the hot effluent gas stream from the reaction zone is passed through a free-flow radiant cooler in admixture with an iron-containing additive. In the radiant cooler at least a portion of the sulfur-containing gases e.g. $H_2S$ and COS react with the iron-containing additive to produce particulate matter comprising iron oxysulfide. Further, a portion of this newly formed particulate matter and/or the iron-containing additive combine with molten slag and/or ash in the hot raw gas stream passing through the radiant gas cooler. The slag produced thereby has a reduced ash fusion temperature and a reduced viscosity. The remainder of the newly formed particulate matter comprising iron oxysulfide and particulate carbon are entrained in the effluent gas stream leaving the radiant syngas cooler and are separated from the effluent gas stream and optionally recycled to the partial oxidation reaction zone in admixture with fresh fuel feed.

30 Claims, No Drawings

POX PROCESS WITH HIGH TEMPERATURE DESULFURIZATION OF SYNGAS

BACKGROUND OF THE INVENTION

This invention relates to the gasification of sulfur-containing liquid hydrocarbonaceous fuel or a slurry of sulfur-containing solid carbonaceous fuel. More specifically it relates to the removal of sulfur-containing gases from the raw effluent synthesis gas stream produced in a refractory lined free-flow gas generator.

As supplies of petroleum gradually diminish sulfur-containing heavy liquid hydrocarbonaceous fuel and/or sulfur-containing coal which is America's most abundant form of fossil fuel will play an increasingly major role in providing for the nation's energy requirements. One ton of coal contains the same amount of energy as three to four barrels of crude oil. Accordingly, in the future it will become necessary to produce an increasing fraction of liquid and gaseous fuels from these sulfur-containing comparatively low cost fuels. The synthesis, reducing, and fuel gases produced from these sulfur-containing materials contain a comparatively high e.g. from about 0.1 to 2.0 mole % of $H_2S$ and COS. The desirability for removing, at high temperatures, a major share of the sulfur present in synthesis gas, as generated in a Partial Oxidation Gasification Process, is widely recognized. In particular, removal of sulfur from syngas at high temperatures would improve combined cycle thermal efficiency by eliminating the need for costly cooling of product gases for low temperature acid gas wet scrubbing such as with Selexol or Rectisol. When the synthesis gas is burned as fuel in a gas turbine, it may be unnecessary to remove the last trace of sulfur. Energy savings such as possible through a high temperature (circa 1000° F.) desulfurization process can outweigh the need to get an extremely low sulfur content fuel gas. The gas produced by this invention may be used with or without further processing and/or purification as a gaseous fuel or as feedstock for the catalytic synthesis of liquid fuels.

Synthesis gas, fuel gas, and reducing gas may be produced from coal by well known gasification processes. For example, coassigned U.S. Pat. Nos. 3,544,291 and 4,289,502 respectively relate to a process for the partial oxidation of slurries of coal, and to an apparatus for producing cleaned and cooled synthesis gas by the partial oxidation of solid carbonaceous fuel.

The problem of ash deposition in syngas coolers of slagging gasifiers was reported in Electric Power Research Institute AP-3806. The subject invention is an improvement in the art since it permits long time operation of the partial oxidation gas generator without shutdown due to accumulation of slag on metal surfaces in the cooling zone. Further, it is superior to the mode wherein iron oxide is mixed with the fuel feedstock to the gasifier, such as described in coassigned U.S. Pat. No. 4,668,428, since iron can accept more sulfur at the lower temperature in the radiant cooler of the subject invention. Further, the thermal energy produced by the sulfur removal reaction may be now recovered in the radiant cooler.

SUMMARY OF THE INVENTION

This is a continuous process for producing a stream of synthesis gas fuel gas or reducing gas by the non-catalytic partial oxidation of sulfur-containing heavy liquid hydrocarbonaceous fuel and/or sulfur-containing solid carbonaceous fuel with a free-oxygen containing gas. A liquid or gaseous carrier is used to introduce the solid fuel into the down-flowing reaction zone of the gas generator. An effluent gas stream is first produced by the partial oxidation of the sulfur-containing heavy liquid hydrocarbonaceous fuel and/or sulfur-containing solid carbonaceous fuel in the free-flow non-catalytic refractory lined gas generator at a temperature in the range of about 1900° F. to 2900° F. and above the ash-fusion temperature of the slag formed in the reaction zone, and a pressure in the range of about 2 to 250 atmospheres. A temperature moderator such as $H_2O$ may be employed when the liquid carrier is a liquid hydrocarbon fuel.

The partial oxidation gas generator is operated so as to convert from about 75 to 95 wt. % of the carbon in the fuel feed to the reaction zone into carbon oxides. The hot effleunt gas stream leaving the gas generator comprises $H_2$, CO, $CO_2$, $H_2S$, COS and at least one gaseous material from the group consisting of $H_2O$, $N_2$, $CH_4$, $NH_3$, and A. Further, entrained in the hot effluent gas stream leaving the reaction zone is particulate carbon e.g. any remaining unconverted fuel and/or soot and the non-combustible inorganic ash portion of the fuel e.g. molten slag from the reacted portion of the solid carbonaceous fuel.

At least a portion e.g. about 20 to 100 volume % of the hot effluent gas stream leaving the reaction zone of the gas generator, with or without removal of a portion of the entrained particulate matter and/or slag, is passed through an unobstructed vertical central passage of a free-flow radiant cooler in admixture with an iron-containing additive. The remainder of the hot effluent gas stream, if any, may be cooled in a quench tank such as shown and described in coassigned U.S. Pat. No. 4,328,006, which is incorporated herein by reference. The iron-containing additive may be introduced into the hot effluent gas stream at the entrance to and/or at one or more locations within the radiant cooler. Sufficient iron-containing additive is introduced into the hot effluent gas stream so as to provide in the radiant cooler a weight ratio of iron-containing additive to sulfur plus ash in the fuel feed in the range of about 0.5–10.0 to 1.0.

A tube-wall comprising pipes or coils through which cooling water is passed line the inside walls of the radiant cooler for use in controlling the reduction of the temperature of the stream of hot effluent gas passing therethrough. The hot effluent gas stream enters the radiant cooler at a temperature in the range of about 1900° F. to 2800° F. and leaves at a temperature in the range of about 1000° F. to 1600° F., such as 1500° F. Cooling is effected by noncontact indirect heat exchange.

As the effluent gas stream passes through the unobstructed central passage of the radiant cooler, at least a portion i.e. about 50–100 weight percent and preferably all of the sulfur-containing gases in the effluent gas stream e.g. $H_2S$ and COS react with the iron-containing additive to produce particulate matter comprising iron oxysulfide. Substantially no new elemental iron is formed from iron-containing additive compounds. Further, a portion e.g. about 5 to 20 wt. % of this newly formed particulate matter and iron-containing additive combine with slag and/or ash in the hot raw gas stream passing through the radiant gas cooler to produce slag with a reduced ash fusion temperature and viscosity, in comparison with the ash fusion temperature and viscosity of the ash and slag produced without the addition of the iron-containing additive. Gravity separation of the slag from the effluent gas stream is thereby facilitated. The remainder of the iron oxysulfide leaves the radiant cooler entrained in the effluent gas stream. The particulate matter is separated from the effluent gas stream by conventional gas-solids separation means and recycled to the reaction zone of the partial oxidation gas generator in admixture with the fuel feed. Alternatively, this newly formed particulate matter may be roasted to produce iron oxide and sulfur-containing gas e.g. $SO_2$. The iron oxide may be recycled to the radiant cooler as a portion of the iron-containing additive, and/or introduced into the partial oxidation reaction zone in admixture with the fuel feed to facilitate removal of the ash. The $SO_2$ may be recovered as a useful by-product. Advantageously, portions of the sensible heat in the stream of hot effluent gas from the partial oxidation reaction zone and from the exothermic reactions going on in the radiant cooler are recovered by indirect heat exchange with the cooling water flowing through the tube-wall in the radiant cooling zone. By-product steam may be thereby produced. Further, the desulfurized product gas is available for use at a higher temperature. Costly reheating is thereby avoided.

DESCRIPTION OF THE INVENTION

The present invention pertains to a continuous process for the production of a desulfurized stream of synthesis gas, fuel gas, or reducing gas from sulfur-containing heavy liquid hydrocarbonaceous fuel and/or sulfur-containing solid carbonaceous fuel in a liquid or gaseous carrier. The hot effluent gas stream is desulfurized in-situ without reducing the temperature.

A typical down-flowing partial oxidation synthesis gas generator is shown in coassigned U.S. Pat. No. 2,818,326. The gas generator is a vertical cylindrical steel pressure vessel lined on the inside with a thermal refractory material. A burner is located in the top of the gas generator along the central vertical axis for introducing the feed streams. A suitable annulus-type burner is shown in coassigned U.S. Pat. No. 2,928,460.

The term sulfur-containing solid carbonaceous fuel includes coal, such as anthracite, bituminous, subbituminous; coke from coal; lignite; residue derived from coal liquefaction; oil shale; tar sands; petroleum coke; asphalt; pitch; particulate carbon (soot); concentrated sewer sludge; and mixtures thereof. The sulfur content of the solid carbonaceous fuel is in the range of about 0.2 to 6.0 wt. %. The ash or inorganic portion of the solid carbonaceous fuel is in the range of about 0.1 to 30 wt. %. Ash from solid carbonaceous fuel substantially comprises the oxides of Si, Fe, V, Ni and Al. The solid carbonaceous fuel may be ground to a particle size so that 100% passes through an ASTM E11–70 Sieve Designation Standard (SDS) 1.40 mm Alternative No. 14. Pumpable slurries of solid carbonaceous fuels may have a solids content in the range of about 25–70 wt. % such as 45–68 wt. %, depending on the characteristics of the fuel and the slurrying medium. The slurrying medium may be water, liquid hydrocarbon, or both.

The term sulfur-containing heavy liquid hydrocarbon fuel, as used herein, is intended to include various materials, such as virgin crude, residue from petroleum distillation and cracking, petroleum distillates, reduced crude, whole crude, asphalt, coal tar, coal derived oil, shale oil, tar sand oil and mixtures thereof. The sulfur and ash contents of the heavy liquid hydrocarbonaceous fuel are respectively in the ranges of about 0.5 to 5.0 weight %; and 100 to 10,000 parts per million. Ash from heavy liquid hydrocarbonaceous fuel substantially comprises the oxides and some sulfides of Fe, Ni, V, and Si.

The use of a temperature moderator to moderate the temperature in the reaction zone of the gas generator depends in general on the carbon to hydrogen ratio of the feedstock and the oxygen content of the oxidant stream. Suitable temperature moderators include steam, water, $CO_2$-rich gas, liquid $CO_2$, recycle synthesis gas, a portion for the cooled clean exhaust gas from a gas turbine employed downstream in the process with or without admixture with air, by-product nitrogen from the air separation unit used to produce substantially pure oxygen, and mixtures of the aforesaid temperature moderators. Water serves as the carrier and the temperature moderator with slurries of liquid hydrocarbon fuels and solid carbonaceous fuel. However, steam may be the temperature moderator with slurries of liquid hydrocarbon fuels and solid carbonaceous fuel. Generally, a temperature moderator is used with liquid hydrocarbon fuels and with substantially pure oxygen. The temperature moderator may be introduced into the gas generator in admixture with either the solid carbonaceous fuel feed, the free-oxygen containing steam, or both. Alternatively, the temperature moderator may be introduced into the reaction zone of the gas generator by way of a separate conduit in the fuel burner. When $H_2O$ is introduced into the gas generator either as a temperature moderator, a slurrying medium, or both, the weight ratio of water to the solid carbon in the solid carbonaceous fuel plus liquid hydrocarbon fuel if any, is in the range of about 0.3 to 2.0 and preferably in the range of about 0.5 to 1.0.

The term free-oxygen containing gas, as used herein, is intended to include air, oxygen-enriched air, i.e. greater than 21 mole % oxygen, and substantially pure oxygen, i.e., greater than 95 mole % oxygen, (the remainder comprising $N_2$ and rare gases). Free-oxygen containing gas may be introduced into the burner at a temperature in the range of about ambient to 1200° F. The atomic ratio of free-oxygen in the oxidant to carbon in the feed stock (O/C atom/atom) is preferably in the range of about 0.7 to 1.5, such as about 0.80 to 1.2.

The relative proportions of solid carbonaceous fuel, liquid hydrocarbon fuel if any, water or other temperature moderator, and oxygen in the feed streams to gas generator, are carefully regulated to convert a substantial portion of the carbon in the fuel feed to the partial oxidation gas generator e.g. 75 to 95 wt. %, such as 80 to 90 wt. % of the carbon to carbon oxides e.g. CO and $CO_2$ and to maintain an autogenous reaction zone temperature in the range of about 1900° F. to 2900° F. and above the ash-fusion temperature of the slag formed in the reaction zone. Advantageously, with sulfur-containing solid carbonaceous feeds, the ash in the solid carbonaceous fuel forms molten slag at such reaction temperatures. Molten slag is much easier to separate from the hot effluent gas than fly-ash. Further, the hot effluent gas leaves the reaction zone at the proper temperature and pressure for the next step in the process. The pressure in the reaction zone is in the range of about 2 to 250 atmospheres. The time in the reaction zone of the partial oxidation gas generator in seconds is in the range of about 0.5 to 10, such as normally about 1.0 to 5.

The effluent gas stream leaving the partial oxidation gas generator has the following composition in mole % depending on the amount and composition of the feedstreams: $H_2$ 8.0 to 60.0, CO 8.0 to 70.0, $CO_2$ 1.0 to 50.0, $H_2O$ 2.0 to 50.0, $CH_4$ 0.0 to 2.0, $H_2S$ plus COS 0.10 to 2.0, $N_2$ 0.0 to 80.0, and A 0.0 to 2.0. Trace amounts of the following gaseous impurities may be also present in the effluent gas stream in parts per million (ppm): HCN 0 to 100; such as about 2 to 20; HCl 0 to about 20,000, such as about 200 to 2,000; and $NH_3$ 0 to about 10,000, such as about 100 to 1000. Entrained in the effluent gas stream is about 0.5 to 20 Wt. %, such as 1 to 4 wt. % particulate carbon (basis weight of carbon in the feed to the gas generator) comprising the remaining portion of the unconverted ash-containing solid carbonaceous fuel feed and/or soot. Molten slag resulting from the fusion of the ash content in the coal or fly-ash is also entrained in the gas stream leaving the generator.

At least a portion e.g. about 20 to 100 volume % of the effluent gas stream leaving the reaction zone of partial oxidation gas generator at a temperature in the range of about 1900° F. to 2900° F., is passed through the unobstructed central axial passage of a radiant cooler. The iron-containing additive may be introduced into the hot effluent gas stream at the entrance to and/or at one or more locations within the radiant cooler. Sufficient iron-containing additive is introduced into the hot effluent gas stream so as to provide in the radiant cooler a weight ratio of iron-containing additive to sulfur plus ash in the fuel feed in the range of about 0.5–10.0 to 1.0. The hot effluent gas stream from the gas generator may be passed in a downward or upward direction through the radiant cooler. For example, a radiant cooler may be connected directly in succession to the discharge outlet of the gas generator, in an arrangement such as shown in U.S. Pat. No. 2,801,158 and in coassigned U.S. Pat. No. 3,551,347, which are incorporated herein by reference.

In one embodiment, refractory-lined first and/or second slag and residue separation chambers may be connected between the discharge outlet of the reaction zone of the gas generator and the inlet to the radiation cooler for separation of a portion of the entrained matter by gravity. For example, see coassigned U.S. Pat. No. 4,251,228, which is incorporated herein by reference. By this means, a portion of the combustion residue entrained in the effluent gas stream leaving the reaction zone may be removed prior to the radiant cooler. This may be done with substantially no reduction in temperature of the effluent gas stream by gravity and/or gas-solids separation means, such as by cyclone or impingement separators. This mode is shown and described in coassigned U.S. Pat. Nos. 4,328,006 and 4,377,394, which are incorporated herein by reference.

Any suitable radiant cooler, such as those in the previously mentioned references, may be used in the subject process. The radiant cooler essentially comprises an elongated cylindrically shaped vertical pressure vessel. The steel walls of the vessel are lined on the inside with a tube-wall which may extend through the full length of the vessel. A coolant such as cooling water or water and steam flows through the individual tubes of the tube-wall. By this means the outer shell of the radiant cooler is protected against the hot gas stream flowing freely through the unobstructed longitudinal central passage of the vessel which is surrounded by said tube-wall. The tube-wall comprises a plurality of adjacent contacting rows of vertical tubes or coils in a concentric ring that is radially spaced from the central longitudinal axis of the vessel.

In one embodiment, a plurality of thin-walled vertical tubes with or without side fins line the inside walls of the radiant cooler. The adjacent rows of tubes are longitudinally welded together to make an annular gas-tight wall of tubes. The lower and upper ends of each said tubes may be respectively connected to lower and upper annular shaped headers. When the coolant in the tube wall is water or a mixture of water and steam, the highest temperature that the pressure shell can reach is the temperature of the saturated steam within the radiant cooler. Boiler feed water is introduced into the bottom header and then passes up through the plurality of separate upright tubes into the top header. The mixture of steam and water is removed from the top header and introduced into an external steam drum where separation takes place. The saturated steam removed from the steam drum may be used elsewhere in the process to provide heat or power. Optionally, at least a portion of the saturated steam may be superheated. The hot water separated in the steam drum may be returned to the bottom header of the radiant cooler. Optionally, for cleaning and maintenance, a plurality of nozzles may be secured on the outside of the tube-wall. By this means, a stream of water, steam or air may be directed against the tube-wall. Thus, the tube-wall may be washed down with water, and any slag deposited thereon may be removed by the wash water. In one embodiment, the inside surfaces of the radiant cooler and the outside surfaces of the tubing in the radiant cooler are provided with a protective metal which substantially reduces any sticking or build-up of slag. See coassigned U.S. patent application Ser. No. 45,632, filed May 4, 1987, which is incorporated herein by reference.

The hot effluent gas stream may enter through either end of the vertical radiant cooler and freely flow through the unobstructed central core. The temperature of the hot effluent gas stream is steadily reduced as it flows through the radiant cooler. By radiation and convection, a portion of the sensible heat in the hot effluent gas stream is absorbed by indirect heat exchange with the cooling water and steam flowing inside of the tube-wall. The temperature of the gas stream is primarily controlled by this means.

The iron-containing additive having a particle size (microns) in the range of about 1.0 to 1000, such as about 5.0 to 100, may be sprayed into the effluent gas stream at the entrance to or within the radiant cooler by means of spray nozzles, aspirators or atomizers. Any suitable number and arrangement of spray nozzles, aspirators, atomizers, or other suitable mixing means may be employed which allow the iron-containing material to intimately contact and mix with the hot effluent gas stream For example, at least one spray nozzle may be located within the radiant cooler at the entrance so that the entering hot effluent gas stream may be immediately contacted by an atomized spray of iron-containing additive. At least one spray nozzle for spraying iron-containing material may be longitudinally spaced at various levels at and/or beyond the entrance of the radiant cooler.

In one embodiment, an aqueous slurry of iron-containing additive material having a solids content in weight % in the range of about 30 to 90, such as about 60 to 80, and at a temperature in the range of about ambient to 200° F. is mixed with the hot effluent gas stream from the partial oxidation gas generator. The rate of introduction and concentration of the slurry are such that after the water carrier is vaporized the weight ratio of the ironcontaining additive that becomes intimately associated with the sulfur-containing gases and any molten slag and/or ash particles in the effluent gas passing through the radiant cooler is in the range of about 0.5 to 10.0 parts by wt. of iron-containing additive for each part by wt. of sulfur plus ash in the fuel feed. The dwell time of the hot gas stream passing through the radiant cooler is in the range of about 5 to 50 seconds, such as about 15 to 40 seconds. In another embodiment, the iron-containing additive is entrained in a gaseous medium selected from the group consisting of steam, air, $CO_2$, $N_2$, recycle synthesis gas, and mixtures thereof.

In another embodiment, the iron-containing additive is iron carbonyl, i.e. $Fe(CO)_5$. Iron penta carbonyl, is a viscous yellow liquid with a boiling point of 102.8° C. It may be prepared by reacting iron or iron oxide with CO or a CO-rich gas at a temperature of about 200° C. A portion of the CO-rich gas produced by the subject partial oxidation process and having a CO content of 30 volume % or more e.g. 50 to 70 volume % may be used in the preparation of iron penta carbonyl. Iron penta carbonyl in the liquid or vapor phase, may be easily mixed with the hot raw effluent gas stream from the partial oxidation reaction zone. Advantageously, there are no grinding costs when this iron-containing additive is used in the subject process.

By the subject process, in the radiant cooler at least a portion e.g. 50 to 100 wt. %, such as about 70 to 95 wt. % of the sulfur originally present in the fuel feed and in the form of sulfur-containing gases e.g. $H_2S$, COS react with the iron-containing additive to produce particulate matter comprising iron oxysulfide. Substantially no new elemental iron is formed in the radiant cooler from ironcontaining additive compounds. By definition, iron oxysulfide is iron sulfide in solution with iron oxide. The iron sulfide may be present in the solution in the range of about 10 to 99 wt. %, and the remainder may comprise iron oxide. Further, the mole % $H_2S$+COS in the effluent gas stream from the gas generator is reduced from a mole % of about 0.10 to 2.0 to less than about 0.05 mole % by the subject process.

The iron-containing additive may comprise an inorganic or an organic iron compound. In one embodiment, the iron containing portion of said iron-containing additive is ferro or ferri organic compound selected from the group consisting of naphthenates, oxalates, acetates, citrates, benzoates, oleates, tartrates, and mixtures thereof. Preferably, the iron-containing additive is elemental iron or an iron compound selected from the group consisting of oxides, carbonates, cyanides, chlorides, nitrates, and mixtures thereof.

In another embodiment, a metallic oxide from the group consisting of copper oxide, zinc oxide, calcium oxide and mixtures thereof is mixed with said iron-containing additive. For example from about 1 to 50 wt. %, such as about 2 to 10 wt. %, of said metallic oxide (basis weight of said iron-containing additive) may be mixed with said iron-containing additive. The oxides of copper and/or zinc like the iron oxide, form sulfides. In addition, copper and zinc oxides catalyze the reactions between steam and carbon in the radiant cooler to produce supplemental $H_2$+$CO_2$, and to complete the conversion of any unburned fuel or soot that may eminate from the partial oxidation unit.

In the preferred embodiment, the gas stream enters the radiant cooler at substantially the same temperature as that which it had when it left the reaction zone of the partial oxidation gas generator i.e. about 1900° F. to 2900° F., less any ordinary drop in the lines i.e. about 50° F. 100° F. temperature drop. Preferably, the temperature of the entering gas stream is above the ash-fusion temperature of any slag that may be entrained in the gas stream. The partially cooled gas stream leaves at the opposite end of the radiant cooler after its temperature has been reduced to a temperature in the range of about 1000° F.–1600° F., such as about 1350° F.–1500° F. The pressure of the gas stream in the radiant cooler is substantially the same as that in the gas generator, less ordinary pressure drop in the lines i.e. about 1 atmosphere pressure drop. At these temperatures and pressures, sulfur-containing gases e.g. $H_2S$ and COS that are produced in the partial oxidation reaction zone along with the effluent gas stream comprising $H_2$+CO react with the iron-containing additive to produce iron oxysulfide. From about 50 to 100 wt. %, such as about 70 to 95 wt. % of the iron oxysulfide leaves the radiant cooler in the form of discrete particles entrained in the effluent gas stream. A portion of the newly formed particles of iron oxysulfide e.g. about 0 to 10 wt. % and/or iron-containing additive combines with molten slag and/or ash in the hot raw gas stream passing through the radiant gas cooler. The molten slag produced thereby has a reduced ash fusion temperature and a reduced viscosity in comparison with those values for the slag entering the radiant cooler. Molten slag in the gas stream passing through the radiant cooler may be converted into solid particles when its temperature falls below the melting point of the slag. At least a portion e.g. about 10 to 100 wt. % of the molten and solid slag particles may be separated from the hot raw gas stream by gravity and may be collected in a separation vessel located below the radiant cooler. The remainder of the slag, if any, may leave the radiant cooler entrained in the cooled gas stream. In one embodiment, at least a portion of the molten and/or solid slag particles are discharged for example, from the lower end or entrance to the vertical radiant cooler and are collected in a catch pot or quench tank located at the bottom of the radiant cooler. See slag chamber 53 of coassigned U.S. Pat. No. 4,328,006, which is incorporated herein by reference.

The remaining particles of iron oxysulfide leave the radiant cooler suspended in the cooled effluent gas stream. The particles of iron oxysulfide and particulate carbon e.g. uncoverted fuel particles and/or soot are separated from the effluent gas stream by conventional gas-solids separation means, and from about 0 to 100 wt. %, such as about 10 to 50 wt. %, may be recycled to the reaction zone of the partial oxidation gas generator in admixture with the fuel feed. In one embodiment, the particles of iron oxysulfide and carbon-containing material are separated from the partially cooled and desulfurized stream of synthesis gas leaving the radiant cooler by means of a cyclone separator or impingement separator of the types shown in coassigned U.S. Pat. Nos. 4,328,006 and 4,377,394, which are incorporated herein by reference. The remainder e.g. about 100 to 0 wt. % of this separated particulate matter comprising iron oxysulfide and particulate carbon may be roasted to produce iron oxide and sulfur-containing gas. The iron oxide and a substantially small amount of other particulate solids, if any, e.g. less than about 1.0 wt. % of ash are then separated from the sulfur-containing gases by conventional gas-solids separation means. The iron oxide may be recycled to the radiant cooler where it is introduced in admixture with make-up iron-containing additive entrained in a liquid or gaseous carrier. Alternatively, a portion of the iron oxide may be recycled to the reaction zone of the partial oxidation gas generator in admixture with said heavy liquid hydrocarbonaceous and/or solid carbonaceous fuel. In one embodiment, prior to roasting, the separated particulate matter is classified e.g. screened to remove material having a particle size greater than about 100 microns. This oversized material is rich in non-iron sulfide material e.g. silicates. In one embodiment, at least a portion e.g. 10 to 100 wt. % of said oversized material is mixed with the sulfur-containing heavy liquid hydrocarbonaceous fuel feed and/or the sulfur-containing solid carbonaceous fuel feed and introduced into the reaction zone of the partial oxidation gas generator as an ash-fusion temperature modifying agent comprising iron oxysulfide and particulate carbon.

Advantageously, in the subject process the catalytic reaction between carbon monoxide and steam may take place in the radiant cooler to produce additional hydrogen and carbon dioxide. In addition, carbon and steam may react in the radiant cooler to produce additional hydrogen and carbon oxides. The iron-containing additive material will catalyze these reactions.

Advantageously, useful thermal energy may be recovered from exothermic reactions that take place in the radiant cooler. By indirect heat exchange between the gas stream flowing through the central passageway of the radiant cooler and the cooling water flowing through the tube-wall, by-product steam may be produced.

The comparatively clean and partially cooled gas stream may leave the downstream end of the gas solids separation zone at a temperature below the maximum safe operating temperature for downstream devices used to recover energy from the hot gas stream such as a conventional convection type gas cooler, an expansion turbine for the production of mechanical or electrical energy, or both. The gas stream may be then passed through a downstream convection-type gas cooler or some other energy utilizing means where its temperature is reduced to a range of about 150° to 600° F. The gas stream may be then optionally subjected to additional process steps including gas scrubbing, methanation reactions, and purification, depending on its intended use as a synthesis gas, reducing gas, or fuel gas.

The advantages achieved by the subject process in which the iron-containing additive is introduced directly into the radiant cooler include the following:

1. A $H_2+CO$ containing product gas is produced containing a reduced amount of sulfur-containing gases.
2. The gas stream passing through the radiant cooler is desulfurized while the temperature is maintained at a high level e.g. greater than 1000° F.
3. The sensible heat in the effluent gas stream from the partial oxidation gas generator may be efficiently used at high temperatures to provide the necessary energy to initiate and to carry out the desulfurization reaction.
4. The residence time in the partial oxidation gas generator may be reduced. This will result in shorter and less costly gas generators.
5. The thermal refractory lining of the gas generator is not subject to attack by contact with an iron-containing material.
6. Low grade solid fuels may be used as feed to the partial oxidation gas generator, without costly upgrading.
7. The iron-containing additive may be intimately mixed with the sulfur-containing gases in the hot gas stream in the radiant cooler. When a liquid carrier is used and it vaporizes, nascent uncontaminated iron-containing material is released at an elevated temperature. In this active form, the iron-containing material is intimately mixed with and contacts the sulfur-containing gases and the molten slag. The conversion rate for the desulfurization and slagging reactions are thereby increased.
8. Separation of the molten slag entrained in the effluent gas stream passing through the radiant cooler may be facilitated. A portion of the iron-containing additive and/or newly formed iron oxysulfide will react with clay materials in the molten slag to form, for example, insoluble potassium ferro aluminosilicates. The melting point of the slag is thereby lowered and its fluidity is increased. In one embodiment, in the lower portion of the upflowing vertical radiant cooler any fluxed molten slag easily separates from the gas stream and drops by gravity into a slag chamber at the bottom of the radiant cooler. A pool of water may be contained in the bottom of the slag chamber. In the remainder of the radiant cooler, the temperature of the gas stream is reduced below the softening temperature of the ash in the fuel so that particulate iron oxysulfide may leave the radiant cooler entrained in the gas stream.

In another embodiment, simultaneously with the introduction of the iron-containing additive into the radiant cooler, an ash fusion temperature modifying agent is introduced into the partial oxidation reaction zone in admixture with the sulfur-containing liquid hydrocarbonaceous fuel and/or sulfur containing solid carbonaceous fuel. By this means, at least a portion of the molten slag e.g. about 10 to 75 wt. % may be removed from the hot raw effluent gas stream prior to the radiant cooler. In such case, the weight ratio of ash fusion temperature modifying agent in the feed mixture to the gas generator to ash in the fuel feed is in the range of about 0.5 to 10, such as about 2 to 5. The ash-fusion temperature modifying agent may be a portion of the previously described iron-containing additive e.g. about 1 to 75 wt. %, such as 5 to 25 wt. % (basis total weight of iron-containing additive).

Other modifications and variations of the invention as hereinbefore set forth may be made without departing from the spirit and scope thereof, and therefore only such limitations should be imposed on the invention as are indicated in the appended claims.

We claim:

1. A continuous process for the production of desulfurized synthesis gas, fuel gas, or reducing gas comprising:
   (1) reacting sulfur-containing heavy liquid hydrocarbonaceous fuel and/or sulfur-containing solid carbonaceous fuel by partial oxidation with a free-oxygen containing gas and in the presence of a temperature moderator in the free-flow refractory lined reaction zone of a gas generator at an autogenous temperature in the range of about 1900° F. to 2900° F. and above the ash-fusion temperature of the slag formed in the reaction zone, and a pressure in the range of about 2 to 250 atmospheres to produce a hot stream of synthesis gas, reducing gas, or fuel gas comprising $H_2$, $CO$, $CO_2$, $H_2S$, $COS$ and at least one gaseous material selected from the group consisting of $H_2O$, $N_2$, $CH_4$, $NH_3$, A, and containing entrained material comprising particulate carbon, and slag;

(2) passing at least a portion of the hot gas stream from (1) in admixture with an iron-containing additive through an unobstructed central passage of a radiant cooler; where in said radiant cooler the weight ratio of iron-containing additive to sulfur plus the ash in the fuel feed is in the range of about 0.5 to 10.0 to 1.0, and wherein said iron-containing additive is introduced into the hot gas stream from (1) at the entrance to and/or at one or more locations within the radiant cooler;

(3) reacting in said radiant cooler said iron-containing additive with the sulfur containing gases in said gas stream to produce particulate matter comprising iron oxysulfide; and combining in said radiant cooler zone a portion of said newly formed particulate matter and/or iron-containing additive with molten slag and/or ash to produce slag having a reduced ash fusion temperature and viscosity; while simultaneously reducing the temperature of said gas stream from an entering temperature in the range of about 1900° F. to 2800° F., to a discharge temperature in the range of about 1000° F. to 1600° F. by indirect heat exchange with a coolant; and (4) discharging from said radiant cooler a partially cooled stream of synthesis gas, reducing gas, or fuel gas and slag; and in comparison with a gas stream produced without the introduction of said iron-containing additive in (2), said partially cooled gas stream contains a reduced amount of sulfur-containing gases, and increased amounts of $H_2$+carbon oxides and iron oxysulfide particulate matter.

2. The process of claim 1 wherein the central passage of said radiant cooler is surrounded by a tube-wall through which cooling water is passed.

3. The process of claim 1 provided with the step of contacting the hot gas stream passing through the central passage of said radiant cooler with an atomized spray of said iron-containing additive.

4. The process of claim 1 provided with the step of separating at least a portion of the slag in (4) from said gas stream by gravity.

5. The process of claim 1 wherein the iron-containing additive in (2) comprises an inorganic or an organic iron compound.

6. The process of claim 1 wherein the iron containing portion of said iron-containing additive in (2) is a ferro or ferri organic compound selected from the group consisting of naphthenates, oxalates, acetates, citrates, benzoates, oleates, tartrates, and mixtures thereof.

7. The process of claim 1 wherein the iron-containing additive in (2) is elemental iron or an iron compound selected from the group consisting of oxides, carbonates, cyanides, chlorides, nitrates, and mixtures thereof.

8. The process of claim 1 wherein the iron-containing additive in (2) is $Fe(CO)_5$.

9. The process of claim 8 wherein said $Fe(CO)_5$ is prepared by reacting a portion of the CO-rich product gas with iron or iron oxide.

10. The process of claim 1 wherein the dwell times in the partial oxidation gas generator in (1) and in the gas cooling zone in (2) are respectively in the ranges of about 0.5–10 seconds and about 5 to 50 seconds.

11. The processes of claim 1 wherein the hot stream of gas leaving the gas generator in (1) is introduced into the gas cooling zone in (2) with substantially no change in temperature and pressure, except for ordinary losses of temperature and pressure in the lines.

12. The process of claim 1 wherein at least a portion of the entrained material and molten slag in the hot gas stream leaving the gas generator in (1) are removed respectively by gas-solids separation means and gravity prior to introducing the hot gas stream into the radiant cooler in (2).

13. The process of claim 1 wherein said sulfur-containing solid carbonaceous fuel is selected from the group consisting of coal, coke from coal; lignite; residue derived from coal liquefaction; oil shale; tar sands; petroleum coke; asphalt; pitch; particulate carbon (soot); and mixtures thereof.

14. The process of claim 1 wherein the iron-containing additive in (2) is introduced into said radiant cooler at one or more levels between the top and bottom of said radiant cooler.

15. The process of claim 1 wherein said sulfur-containing liquid hydrocarbonaceous or solid carbonaceous fuel is introduced into said partial oxidation reaction zone entrained in a liquid or gaseous carrier.

16. The process of claim 15 wherein said liquid carrier is selected from the group consisting of water, liquid hydrocarbonaceous fuel, and mixtures thereof.

17. The process of claim 15 wherein said gaseous carrier is selected from the group consisting of steam, air, $N_2$, $CO_2$, recycle synthesis gas, and mixtures thereof.

18. The process of claim 1 in which said temperature moderator is selected from the group consisting of steam, water, $CO_2$-rich gas, liquid $CO_2$, $N_2$, recycle synthesis gas, exhaust gas from a turbine, and mixtures thereof.

19. The process of claim 1 in which said freeoxygen containing gas is selected from the group consisting of air, oxygen-enriched air, i.e. greater than 21 mole % $O_2$, and substantially pure oxygen, i. e. greater than about 95 mole % $O_2$.

20. The process of claim 1 wherein the cooolant in step (3) is water or a mixture of water and steam, and by-product steam is produced by said indirect heat exchange.

21. The process of claim 1 provided with the step of separating iron oxysulfide and particulate carbon from the cooled effluent gas stream leaving the radiant cooler and recycling about 0 to 100 wt. % of said material to the reaction zone of the partial oxidation gas generator.

22. The process of claim 1 provided with the steps of separating particulate matter comprising iron oxysulfide and particulate carbon from the partially cooled gas stream from (4) in a gas-solids separation zone, roasting said particulate matter thereby substantially producing iron oxide and sulfur-containing gas, and separating said iron oxide from said sulfur-containing gas.

23. The process of claim 22 provided with the step of introducing a portion of said iron oxide in admixture with make-up iron-containing additive entrained in a carrier into the radiant cooler in (2), where said materials are mixed with said hot gas stream.

24. The process of claim 22 provided with the step of introducing a portion of said iron oxide into said partial oxidation reaction zone in (1) in admixture with said heavy liquid hydrocarbonaceous and/or solid carbonaceous fuel.

25. The process of claim 22 provided with the step of classifying said particulate matter prior to said roasting step and separating out materials having a particle size greater than about 100 microns.

26. The process of claim 25 provided with the step of mixing said materials having a particle size greater than about 100 microns with the sulfur-containing heavy liquid hydrocarbonaceous fuel feed and/or sulfur containing solid carbonaceous fuel feed in step (1), and introducing at least a portion of said mixture into the reaction zone of the partial oxidation gas generator.

27. The process of claim 2 wherein the inside surfaces of said radiant cooler and the outside surfaces of the tubing within said radiant cooler are provided with a protective metal which substantially reduces any sticking or build-up of slag.

28. The process of claim 1 wherein the hot gas stream from (1) is passed either in a downward or upward direction through said radiant cooler.

29. The process of claim 1 wherein the hot gas stream from (1) is contacted in said radiant cooler with at least one atomized spray or iron-containing additive at and-/or beyond the entrance of said radiant cooler.

30. The process of claim 1 wherein a metallic oxide from the group consisting of copper oxide, zinc oxide, calcium oxide and mixtures thereof is introduced into the radiant cooler in (2) in admixture with said iron-containing additive.

* * * * *